(No Model.)

W. B. GUIMARIN.
STOP AND WASTE VALVE.

No. 565,205. Patented Aug. 4, 1896.

Witnesses
T. B. Ford
S. M. Wood

Inventor
WILLIAM B. GUIMARIN
By Attorney

UNITED STATES PATENT OFFICE.

WILLIAM B. GUIMARIN, OF ATLANTA, GEORGIA.

STOP AND WASTE VALVE.

SPECIFICATION forming part of Letters Patent No. 565,205, dated August 4, 1896.

Application filed March 9, 1896. Serial No. 582,502. (No model.)

*To all whom it may concern:*

Be it known that I, WILLIAM B. GUIMARIN, of Atlanta, in the county of Fulton and State of Georgia, have made a certain new and useful Invention of a Stop and Waste Valve; and I do hereby declare the following to be a full, clear, and exact description of the device, such as will enable others skilled in the art to which it appertains to make and use the same, reference being had to the accompanying drawings, and to the letters of reference marked thereon, which form a part of this specification.

This invention relates to cut-off valves for controlling the admission of water to residences or other places, and simultaneously operating a waste-valve capable of draining not only the cold-water circuit of pipes but the pipes carrying hot water also.

Figure 2:
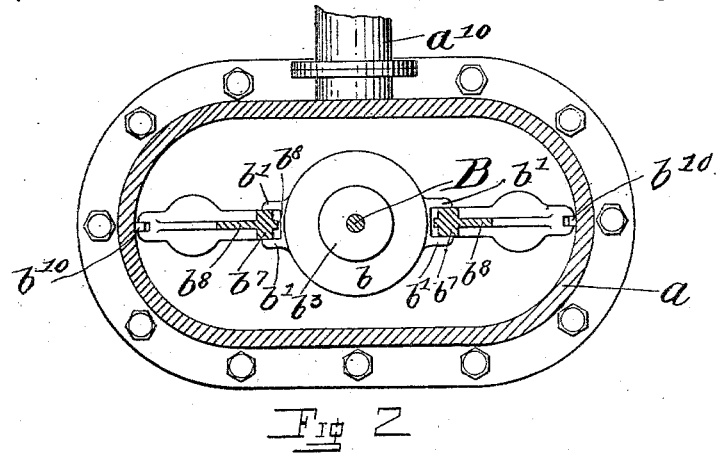
Figure 1:
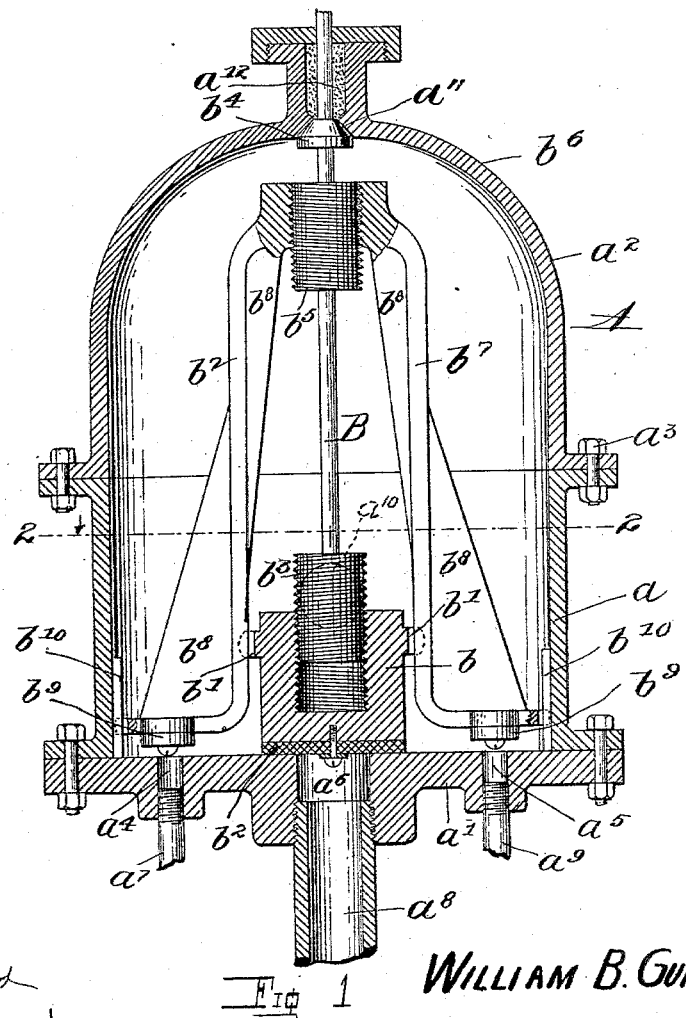

In the accompanying drawings, Figure 1 is a vertical section of the casing, showing the supply-pipe closed and the waste-valves open. Fig. 2 is a section on the line 2 2, Fig. 1, showing a plan of the parts below said line.

In both figures the reference-marks are uniformly employed.

A is a casing which is composed of a bottom section $a$ and a bottom proper, $a'$, which parts may be either bolted together by flanges, as shown, or otherwise secured together, or they may be made integrally. Secured to the upper end of the part $a$ of the casing is the cap $a^2$, which may obviously be of any form and be secured in place in any desired manner, the form shown, however, being preferred for valves of the larger variety and consisting of annular flanges secured in abutment by bolts $a^3$. Passages $a^4$ $a^5$ $a^6$ are provided in the bottom $a'$, and in these passages are screwed or otherwise suitably secured the pipes $a^7$ $a^8$ $a^9$, respectively, said pipes being connected as follows: The pipe $a^8$ is connected with the main and delivers water through the street, while the pipe $a^7$ is connected with the hot-water circuit at the point where the best drainage for the whole system would be obtained, and the pipe $a^9$ is connected with a sewer or laid to a suitable discharge-point for waste water.

$a^{10}$ is the outlet-pipe and leads to the cold-water circuit in the building, preferably passing from the casing-section $a$.

In the upper end of the section $a^2$ is an opening suitable for a valve-stem, a seat $a^{11}$ for a valve being provided at the lower end of said opening, and it is preferred that a stuffing-gland $a^{12}$ should be provided for said stem.

$b$ is a valve consisting of a block centrally bored vertically of its length and internally screw-threaded and provided with bifurcated lugs $b'$ on opposite sides. This block is shod with a gasket of rubber or other suitable material suitably secured thereto and conforming in shape with the abutting surface of the plate $a'$, or made to conform therewith by shaping the block aforesaid.

B is a stem which has its bearings at one point in the stuffing-gland $a^{12}$, and carries on its lower end an externally-screw-threaded plug $b^3$, adapted to screw into the block $b$. A valve $b^4$ is mounted on this stem B and seats upon the seat $a^{11}$. Also mounted on the stem B is another cylindrical plug $b^5$, which is externally screw-threaded in a direction opposite that of the plug $b^3$.

$b^6$ is a hub which is bored and internally screw-threaded and adapted to traverse the plug $b^5$ and be moved vertically by the revolution thereof. Arms $b^7$, suitably stiffened by webs $b^8$, are secured to this hub and project downwardly therefrom, their lower ends being guided to prevent the rotation of said arms around stem B, and carrying a valve $b^9$ on the lower end of each, which is adapted by its depression to close the passage $a^5$. In the construction shown each of these arms $b^7$ lies between the two members of the correlative bifurcated lug $b'$ and, extending downwardly therebelow, is turned outwardly and braced so as to stand rigid in that position, its end being bifurcated and engaging the correlative rib $b^{10}$ on the inner side of the casing, being enlarged or otherwise prepared as a support and backing for the valve $b^9$ hereinbefore described.

The operation of this device is as follows: The valve $b$ is raised by a rotation to the desired extent of the stem B, and at the same time the plug $b^5$ is revolved in the same direction to the same extent, which forces downwardly the hub $b^6$ and consequently the arms $b^7$, causing the valves $b^9$ to close the passages $a^4$ and $a^5$. This turns on water from the main to the house through the pipe $a^8$, passage $a^6$, the interior of the casing A, and the pipe $a^{10}$. This obviously not only supplies water to the cold-water circuit, but also through interconnecting pipes to the hot-water circuit. A reversal of the stem B reverses the relative position of the valves $b$ and $a^5$, the latter for the exit of water from the casing A, which came thereinto both through the cold-water pipe $a^{10}$ and the hot-water drain-pipe $a^7$. Hence it will be seen that all the pipes of the house properly laid will be drained by one operation of this device.

Having thus described my device, what I claim as new, and desire to secure by Letters Patent of the United States, is—

1. In a stop and waste cock, a casing having two inlets, an outlet-passage and a drain-passage, a stem rotatably mounted in said casing, right-hand and left-hand screw-threads on said stem, a valve mounted on and adapted to traverse one of said screw-threads and governing the main inlet-passages and a hub carrying arms thereon mounted on the stem on the other of said screw-threads so as to traverse same, valves carried on the lower ends of said arms and governing the other inlet and the drain passage and means for preventing the independent rotation of said arms and valve around said stem, for the purpose specified.

2. In a stop and waste cock, a casing having two inlets, an outlet-passage and a drain-passage, a stem rotatably mounted in said casing, right-hand and left-hand screw-threaded plugs on said stem, a valve having lugs on its sides and mounted on and adapted to traverse one of said plugs and governing the main inlet-passage and a hub carrying arms thereon mounted on the other of said plugs so as to traverse same and engaging the lugs on said valve, their free ends moving in guides on the casing, valves carried on the lower ends of said arms and governing the other inlet and the drain passage and said guides on said casing.

In testimony whereof I hereunto affix my signature in presence of two witnesses.

WILLIAM B. GUIMARIN.

Witnesses:
A. P. WOOD,
S. M. WOOD.